No. 609,077. Patented Aug. 16, 1898.
W. BROWN.
BICYCLE GEARING.
(Application filed June 21, 1897.)
(No Model.)
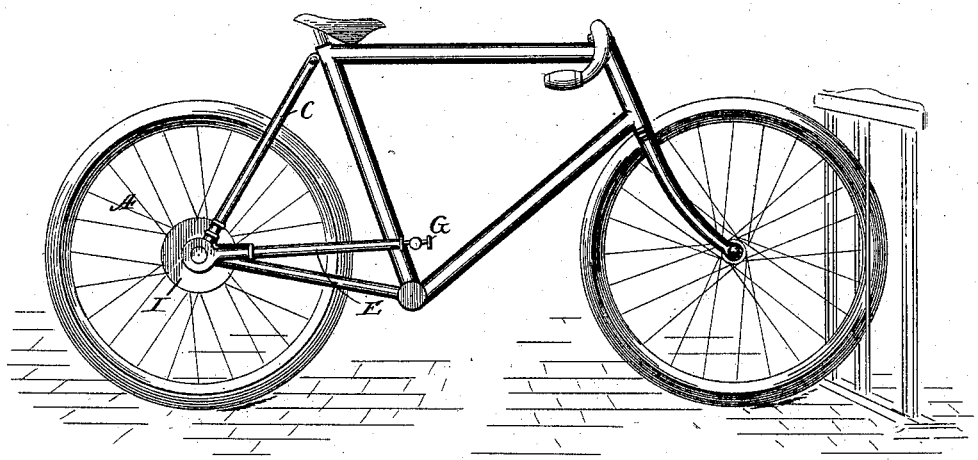
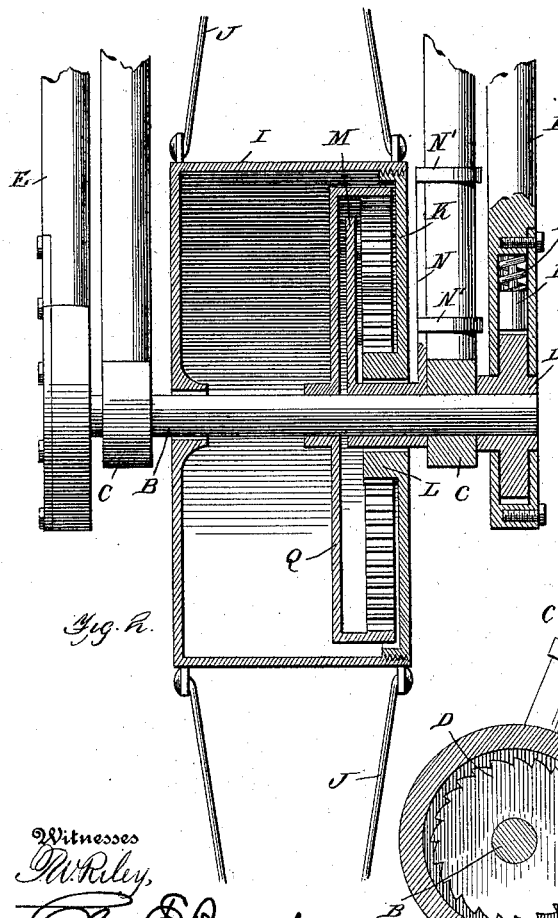
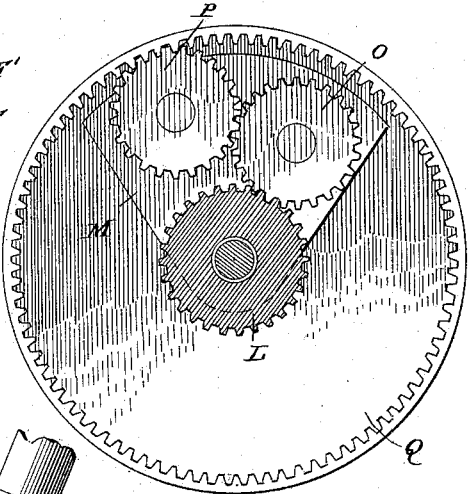
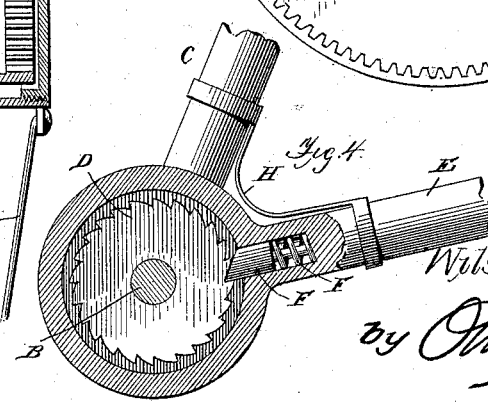
Witnesses
W. Riley,
Chas. E. Brock
Inventor
Wilson Brown,
by O'Meara & Co.
Attorneys

UNITED STATES PATENT OFFICE.

WILSON BROWN, OF GALVESTON, TEXAS.

BICYCLE-GEARING.

SPECIFICATION forming part of Letters Patent No. 609,077, dated August 16, 1898.

Application filed June 21, 1897. Serial No. 641,629. (No model.)

*To all whom it may concern:*

Be it known that I, WILSON BROWN, residing at Galveston, in the county of Galveston and State of Texas, have invented a new and useful Bicycle-Gearing, of which the following is a specification.

My invention relates to gearing for bicycles, and has for its object to furnish a train of gearing for the connection of the treadles with the rear wheel of a bicycle, whereby the usual sprocket-and-chain gearing may be dispensed with.

With this object in view my invention consists in the improved construction, arrangement, and combination of parts hereinafter fully described, and afterward particularly pointed out in the claim.

In order to enable others skilled in the art to which my invention most nearly appertains to make and use the same, I will now proceed to describe its construction and operation, reference being had to the accompanying drawings, forming part of this specification, in which—

Figure 1 is a view in side elevation of a bicycle having my invention applied thereto. Fig. 2 is a detail view, on an enlarged scale, being a central section through the hub of the rear wheel, the rear forks and the pedal-levers being shown in plan, one end of one of the pedal-levers being shown in section. Fig. 3 is a view in elevation of the gearing removed from the hub. Fig. 4 is a detail sectional view of the inner end of the pedal-lever and its connections.

Like letters of reference mark the same parts wherever they occur in the different figures of the drawings.

Referring to the drawings by letter, A is the rear wheel, and B the rear axle, of a bicycle. The axle has its bearing in the lower ends of the rear fork C, and projecting beyond the rear fork is provided on each end with a ratchet-wheel D. On the trunnions of these ratchet-wheels are mounted the rear ends of pedal-levers E, which are free to move around the ratchet-wheel in one direction, but carry pawls F, impelled forward by springs F', into contact with said ratchet-teeth, whereby motion of the pedal-levers in the other direction will rotate the ratchet-wheels, and consequently the shaft B, to which they are attached. Pedals G are pivotally secured to the front ends of said pedal-levers, and pressure downward upon the pedals will cause the pedal-levers and ratchet mechanism to carry the shaft of the rear wheel around in a forward direction, the pedal-levers being returned to their upper positions by means of springs H, connecting them with the fork-bars.

I is the hub of the rear wheel, in the form of a drum and rigidly secured in position by the spokes J. One side K of the drum is removable and is provided with a central inward-projecting hub, upon which is integrally formed a central gear-wheel L.

A segmental plate M, having a hub which passes through the central opening of the plate K, before referred to, is rigidly secured to the fork-bars C by means of a plate N and bands N'. In this segment-plate is journaled a gear-wheel O, which meshes with the gear-wheel L, before referred to, and also with a gear-wheel P, also journaled in the segmental plate M. The gear-wheel P meshes with the teeth of an internal-gear wheel Q, rigidly secured to the shaft B.

The operation of my device may be described as follows: Pressure downward being applied to the pedals by the rider, the pedal-levers will communicate their motion to the ratchet-wheel D through the medium of the pawl F and spring F', thus causing the shaft B to rotate in a forward direction and carry with it an internal-gear wheel Q. This internal-gear wheel communicates motion in the same direction to the gear-wheel P, which in turn moves the gear-wheel O in a backward direction, while this gear-wheel O turns the gear-wheel L in a forward direction. The gear-wheel L being rigidly attached to the plate K of the hub I of the wheel will cause the hub, spokes, rim, and tire to be rotated in a forward direction, thus carrying the bicycle forward.

The difficulty heretofore encountered in providing a bicycle with chainless gearing has been mainly owing to the fact that the wheel must move much more rapidly than the pedal-shaft. This is accomplished in my invention, and the speeding can be varied at will by changing the size of the smaller gears L, O, and P. In the construction as illustrated the internal-gear wheel Q, which is carried by the axle and receives motion direct from the pedal, is provided with eighty-eight teeth, while the central gear, which is secured rigidly to the hub of the wheel, is provided with but twenty-eight teeth. From this it will follow that a single revolution of the shaft C, which in this case is the pedal-shaft, will rotate the wheel three and one-seventh times, which would be equivalent to gearing a twenty-six-inch wheel up to about eighty-two.

The advantages attending the use of my invention will be obvious from the foregoing description. The construction is simple and cheap, as well as durable and effective. It is not specially liable to get out of order, and if any part should be broken or lost it can be repaired or replaced by any ordinary mechanic. The gearing is entirely concealed, so that it is not liable to soil the clothing of the rider nor to become packed with dirt or dust, as do the chain and sprockets now in common use. The transmission of power is direct and without any possible liability of slipping, and while I have illustrated and described the best means now known to me for carrying out my invention I desire it to be understood that I do not restrict myself to the exact details of construction shown and described, but hold that any such slight changes or variations therein as might suggest themselves to the ordinary mechanic would properly fall within the limit and scope of my invention.

Having thus fully described my invention, what I claim as new, and desire to secure by Letters Patent of the United States, is—

The combination with the side bars of the machine, of the rear axle journaled therein, the ratchet-wheels rigidly secured to the axle outside the side bars, the long pedal-bars pivoted upon the hubs of the ratchet-wheels, the sliding spring-pawls in the pedal-arms engaging the teeth of the ratchet-wheels, the rings embracing the side bars and pedal-arms respectively, and the spring-bars connecting said rings, substantially as described.

WILSON BROWN.

Witnesses:
CLAUDE MCCALEB,
L. J. SELBY.